United States Patent [19]

Pfeffer

[11] 4,457,016
[45] Jun. 26, 1984

[54] FILE LABEL READING SYSTEM

[75] Inventor: George B. Pfeffer, Minnetonka, Minn.

[73] Assignee: Datafile Limited, Willowdale, Canada

[21] Appl. No.: 192,631

[22] Filed: Oct. 10, 1980

[51] Int. Cl.³ .............................................. G06K 9/00
[52] U.S. Cl. ...................................... 382/59; 235/454; 235/472; 235/483; 235/484
[58] Field of Search ................ 235/454, 472, 462–463, 235/483–486; 340/146.35 Y, 146.35 SG, 146.35 Z; 250/567–569; 33/32 R, 32 C, 42, 403, 427, 448; 382/59

[56] References Cited

U.S. PATENT DOCUMENTS

| | | | |
|---|---|---|---|
| 3,238,501 | 3/1966 | Mak et al. | 235/472 |
| 3,320,429 | 5/1967 | McGregor | 250/567 |
| 3,685,723 | 8/1972 | Berler | 235/472 |
| 3,736,410 | 5/1973 | Ragland et al. | 235/472 |
| 3,812,347 | 5/1974 | Cunningham et al. | 250/568 |
| 3,859,632 | 1/1975 | Etter | 340/146.35 Y |
| 3,918,029 | 11/1975 | Lemelson | 340/146.35 Y |
| 3,963,901 | 6/1976 | Gevas | 235/472 |
| 3,964,022 | 6/1976 | Martin | 235/472 |
| 3,991,299 | 11/1976 | Chadima, Jr. et al. | 235/472 |
| 4,030,195 | 6/1977 | Insolio | 33/32 B |
| 4,118,687 | 10/1978 | McWaters et al. | 382/59 |
| 4,158,194 | 6/1979 | McWaters et al. | 235/454 |
| 4,180,204 | 12/1979 | Koenig et al. | 235/454 |
| 4,204,636 | 5/1980 | Hayman | 235/472 |
| 4,210,802 | 7/1980 | Sakai | 235/472 |

Primary Examiner—Leo H. Boudreau

[57] ABSTRACT

The present invention provides a manually controlled wand which is particularly suited for use in a file control system in which the files are provided with machine readable codes located along an edge of the file. The wand is adapted by the provision of a jig used to bear against the edge of the file for locating the wand in a read position over the code and riding along the file edge to guide and steady the manual movement of the wand to provide an accurate reading of the code.

21 Claims, 15 Drawing Figures

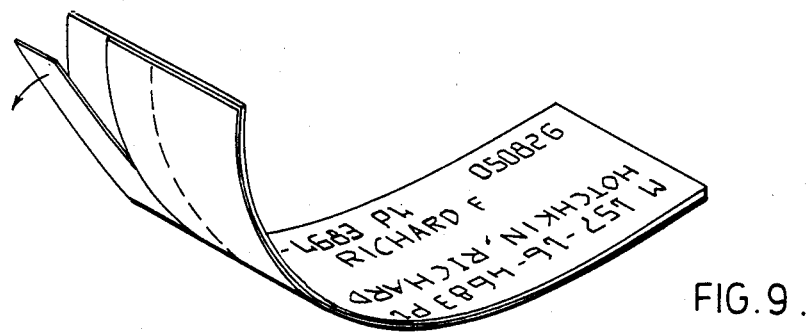
FIG. 9.
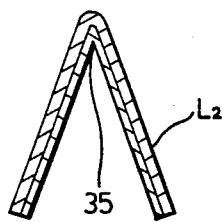
FIG. 10.
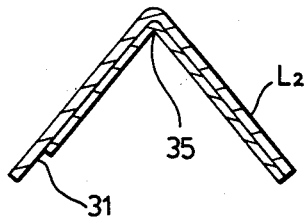
FIG. 11.
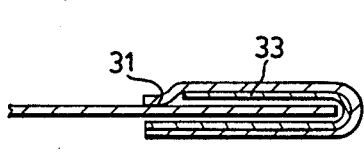
FIG. 12.
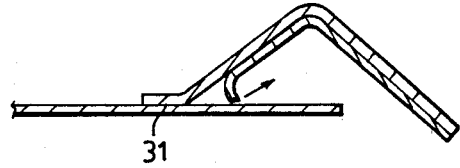
FIG. 13.
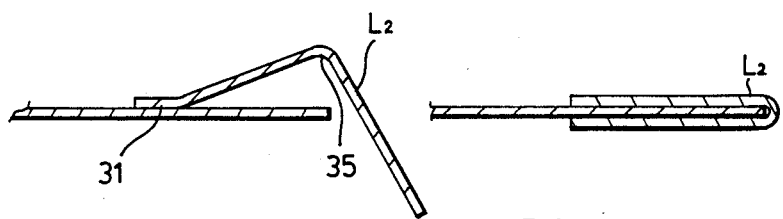
FIG. 14.
FIG. 15.

FILE LABEL READING SYSTEM

FIELD OF THE INVENTION

The present invention relates to a hand held wand which is particularly adapted for reading a machine readable code provided on a surface and running parallel to an edge thereof, wherein the edge acts as a guide in controlling and steadying manual movement of the wand. The wand is particularly suitable for use in file control systems where the machine readable code is of limited size requiring. precise manual positioning and control of the wand to ensure a proper machine reading of the code.

BACKGROUND OF THE INVENTION

Over the past few years there has been a substantial movement to the use of machine readable codes in certain areas such as inventory control systems and more recently, file control systems. According to the inventory control system, where the machine reading of the codes is used for determining sales figures, the cashier will at the time of sale, machine read the code applied to the article and feed the code into a recorder for recording the sale.

Similar systems have been introduced for file control in recording the whereabouts of individual files from filing systems comprising hundreds and even thousands of files where each of the files may be handled and removed from the system by a number of people at different stations. Accordingly, it is extremely important to have a record of the station in charge of the file and of the file's location to prevent the misplacing or loss of the file. Furthermore, there are often times when an individual from one station may remove the file from the system and an individual from a second station may have an immediate need for the file. The whereabouts of the file must therefore, be recorded in a manner which permits rapid locating for retrieval of the file.

The control systems described above only work as long as the records that are kept are accurate and include a true machine reading of each coded article in the system. Where fully automated equipment provided with positioning conveyors etc., are used to read the codes, the accuracy of the system is generally acceptable. However, in many instances, the provision of fully automated equipment for both automatically positioning the article in a read position and for machine reading the code is not feasible. For instance, space restraints may be such that this equipment can not be used; the cost of such automated equipment may be prohibitive or its use may simply not be desirable in certain applications.

There is therefore, a need for an accurate machine readable code reading system that incorporates the use of a handheld reader, generally known as handheld wand. It is in such a system where the wand is manually operated that the obtaining of an accurate reading of the machine readable code can present problems. This is particularly true in light of present day technology in which available handheld wands have a narrow and precise scan field requiring accurate positioning of the wand. For example, when the machine readable code is formed from small machine readable characters such as the machine readable and optically recognizable characters of the O.C.R. set which may be in the order of 0.1 inches in height, the wand must be located such that it is within 0.1 inches of either side of the characters.

SUMMARY OF THE INVENTION

The present invention relates to a hand held wand adapted for accurate reading of a machine readable code provided on a surface having a guide edge running essentially parallel to the code. The wand is provided with guide means adapted to bear against and ride along the guide edge parallel to the code for guiding manual positioning and moving of the wand over the code to enable consistently accurate machine reading of the code.

The code after having been accurately read by the wand may then be fed to a recording system where identifying information regarding the article on which the code is provided, is stored for later recall. This system is particularly useful in the control of files as it permits rapid location of the whereabouts of the file.

BRIEF DISCUSSION OF THE DRAWINGS

The above as well as other advantages and features of the present invention will be described in greater detail according to the preferred embodiments of the present invention wherein:

FIG. 9 shows a preferred form of a label according to the present invention adapted for accurate location along the edge of a file.

FIGS. 10 through 15 are side views showing the steps required in the application of the label of FIG. 9 to a file edge.

DETAILED DESCRIPTION ACCORDING TO THE PREFERRED EMBODIMENTS OF THE PRESENT INVENTION

Figure 1:
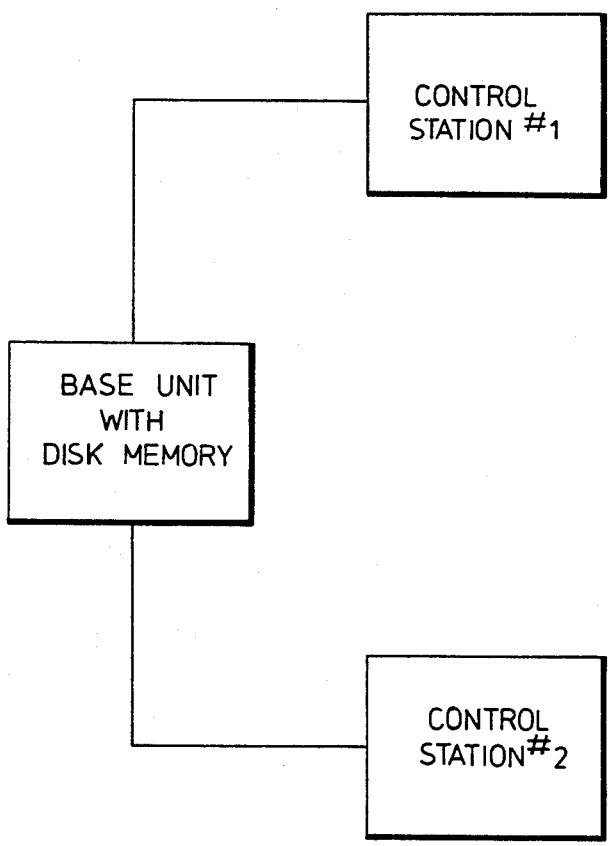
FIG. 1 is a schematic view showing a preferred file control system according to the present invention.

The arrangement shown in FIG. 1 is a system which is particularly suitable for use in recording the whereabouts of file folders from large filing systems. The system comprises a base unit with disc memory and two separate control stations which feed information to the base unit for recording on the disc memory. It will be appreciated that more than two control stations will be used when required. For example, in a large hospital filing system where there are thousands of files, there may be a control station at a number of different locations around the hospital. Each one of these control stations is fixed in location and is automatically identified at the base unit upon actuation of the control station. For instance, when Control Station No. 1 is operated, the base unit automatically identifies that specific control station. If on the otherhand, a file goes through Control Station No. 2, that control station is automatically identified at the base unit.

Figure 2:
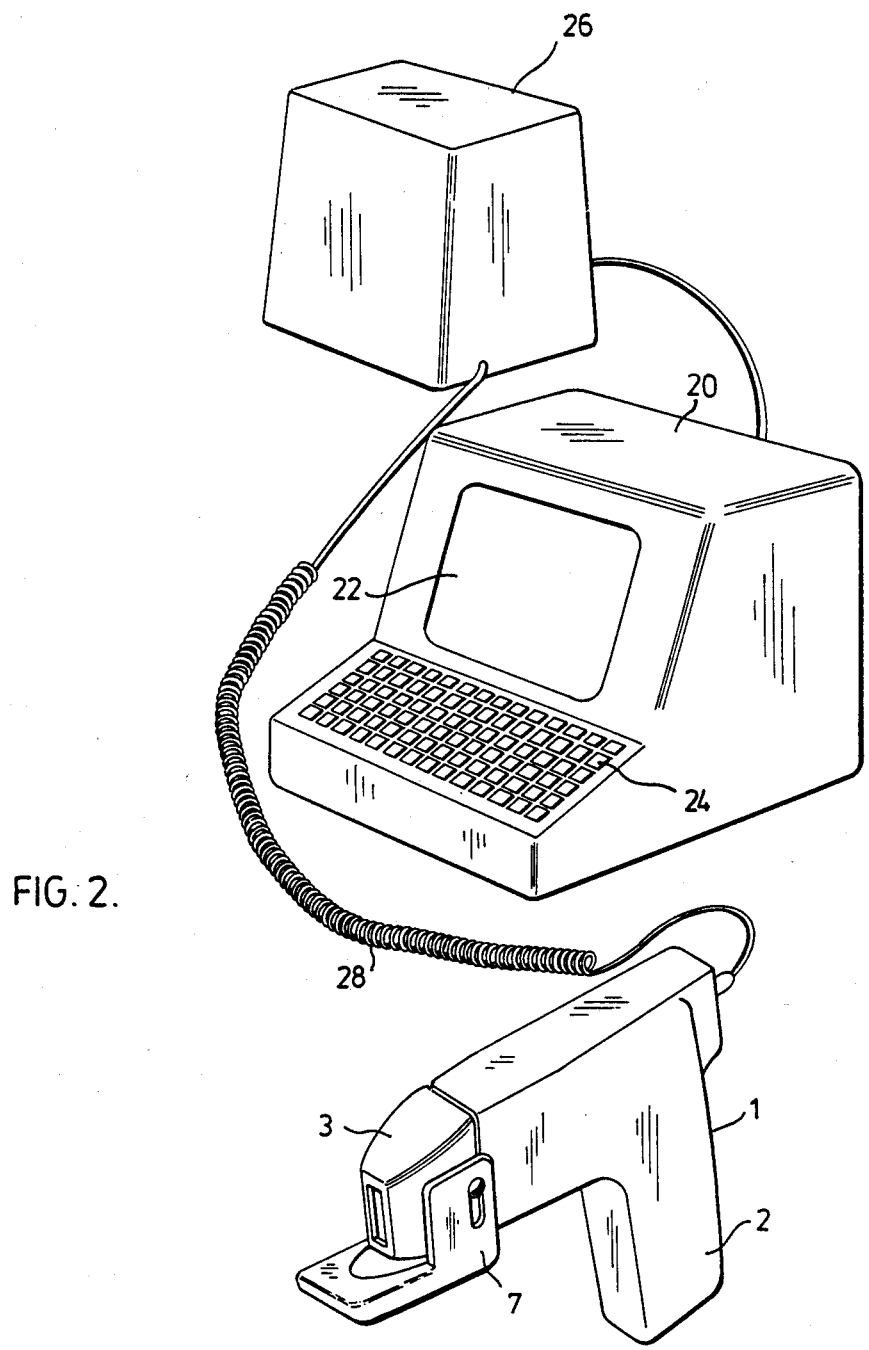
FIG. 2 shows in perspective, a control station of the system shown in FIG. 1.

An individual control station as shown in FIG. 2 comprises a hand held wand 1 connected by a flexible cord 28 to a wand electronics box 26 which interprets the characters scanned by the wand and which is in turn, electrically connected to a display unit 20. The display unit is provided with visual display panel 22 and a keyboard 24. Each of the operator or control stations may be further provided with a printer for printing the information recorded at the control station. This information is in turn, fed to the disc memory of the base unit which may be additionally provided with a backup tape unit, a controller, and a printer for printing the information fed to the disc memory.

Figure 3:
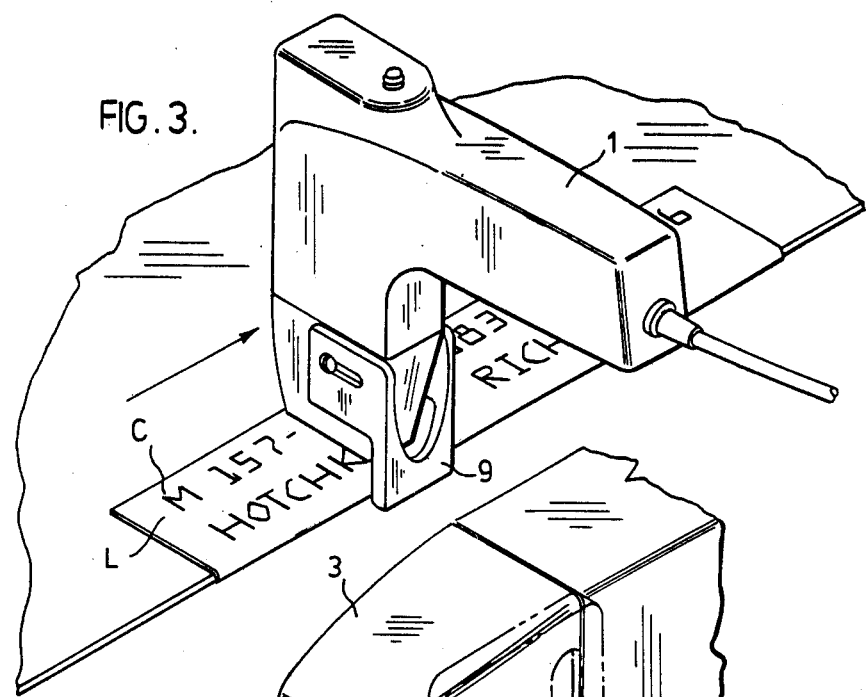
FIG. 3 is a perspective view looking down on a preferred form of a hand held wand according to the present invention when in position for machine reading a file code.
Figure 7:
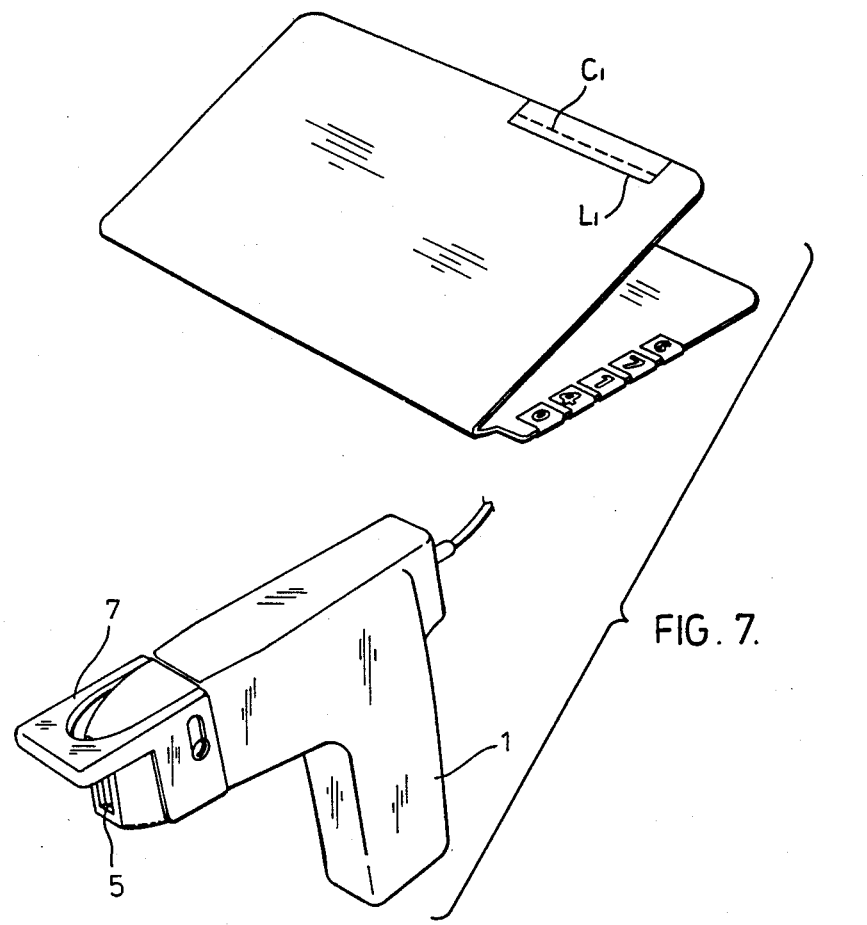
FIG. 7 is a perspective view looking down on a file which is coded along its upper edge and a wand adapted for machine reading of that code.

The hand held wand of FIG. 2 is particularly adapted for reading a machine readable code running parallel to the side edge of a file such as that shown in FIG. 3. FIG. 7 on the otherhand shows a wand adapted to read a code running parallel to a top edge of a file. This machine reading of the code provides a method for locating the whereabouts of the file. Again by way of example, many people from different sections of a hospital would have access to the hospital filing system, and an individual removing a file from the filing system would then return to his or her section having its own control station where the removal of the file is recorded by a machine reading of the code made at that particular Control station.

The file is identified by its code C, which like the codes on all of the other files in the system is prerecorded at the base unit. The machine reading the file at each Control Station is therefore, matched with the prerecorded code at the base unit and at the same time, further locating information such as date and time of identification is recorded on the disc memory of the base unit. As described above, the location of the particular control station in operation is automatically identified at the base unit. All of this information which is easily retrieved from the base unit can now be used to locate the whereabouts of the file. This system can of course, be set up to the point where identifying information as to the actual individual in charge of the file is recorded at the base unit.

The system will only record identifying information as long as a valid reading is made of the code. Accordingly, each of the codes on all of the files of the system have an identical number of machine readable characters and either the Control Stations itself, or the base unit is set up to look for that specific number of characters. If for instance, each code has nine machine readable characters, and if only eight of those characters are machine read by the wand, then a warning is given by the system that there has not been a valid reading of the code. For example, each of the Control Stations shown in FIG. 2 is provided with a beeper which audibly advises an invalid code reading. Only in the event of a valid reading of the code will all the appropriate recordings be made at the base unit.

When the file is being returned to the system, it is again run through the Control Station where the keyboard is used to indicate return of the file, and the return information is then fed into and recorded at, the base unit.

A feature of each of the Control Stations is the provision of the display panel on each display unit. This display unit will be provided in systems which incorporate the use of codes comprising both machine readable and optically recognizable characters, such as those shown in the drawings. As the wand is passed over the machine readable code, a recognition of the code is made at the wand electronics box and while the code is being fed to the base unit, it is additionally printed across the display panel. This printing of the code on the display panel can then be used for visual verification of a valid code reading.

Figure 6:
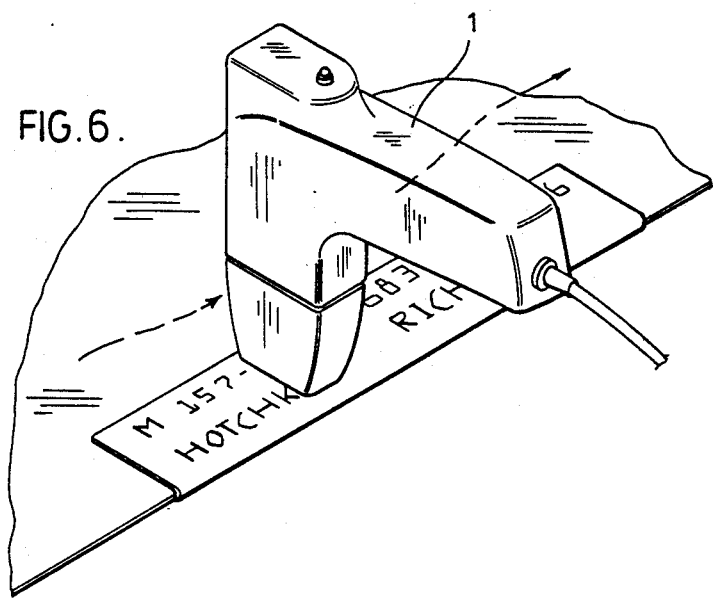
FIG. 6 is a perspective view looking down on a hand held wand without the jig shown in FIGS. 3 through 5.

The wand which comprises a handle portion 2 used to hold the wand and a forward nose region 3, is provided at its forward end with a vertical read window 5. The read window must be properly located in a read position over the code to ensure such accurate readings. A diode housed interiorly of the nose region shines out through the read window which has a height of approximately 0.4 inches and which narrows in scan to about 0.3 inches during machine reading. The particular wand shown in the drawings is adapted for reading characters of the O.C.R A Size 1 set as found on the coded file of FIG. 3. These characters are only about 0.1 inches in height and since they should be approximately centered with respect to the read window, there is a maximum tolerance of about 0.1 inches to either side of the characters. It is therefore, important that the wand be maintained in a steady read position over the characters for a valid machine reading of the code. If the movement of the wand is unsteady to the extent that the characters do not fall within the maximum tolerance, there will not be a valid machine reading of the code. Furthermore, the wand must be moved at a generally steady speed over the code. If it is moved to quickly, or too slowly, there is little likelihood of obtaining a valid reading. When using a wand such as that shown in FIG. 6 which does not have any means for guiding or steadying movement of the wand, it is very difficult to consistently obtain accurate machine readings of the code.

The wand arrangements as shown in FIGS. 2 through 5 and FIGS. 7 and 8, are adapted to overcome this guidance problem and to enable a consistent valid machine reading of a machine readable code running parallel to the edge of the file.

Figure 8:
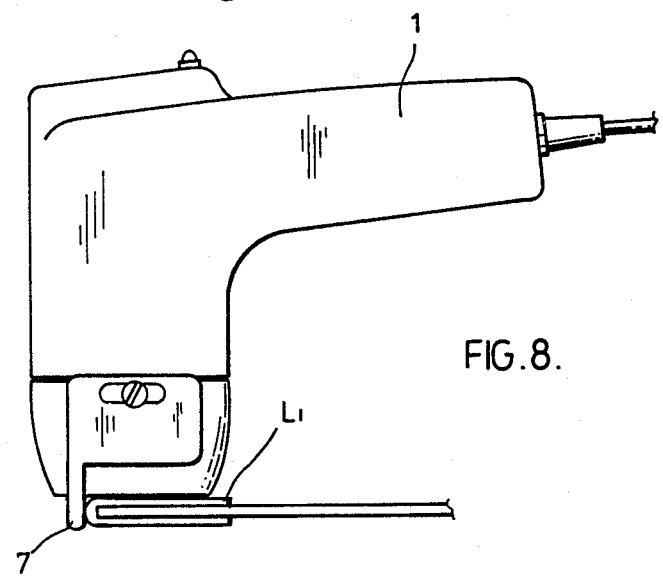
FIG. 8 is a side view showing the wand of FIG. 7 in a read position over the code.

Wand 1 shown in each of these arrangements is provided with a jig 7 presenting a forward flat face 9, which is adapted to bear against and ride along the guide edge of the file. The first arrangement shown in FIGS. 2 through 5 is as mentioned above, used to read a code applied along a side edge of a file where the label is read from above the jig. The wand arrangement shown in FIGS. 7 and 8 is as also mentioned above, used to machine read a code applied along a top edge of a file with the jig being reversed in position from that shown in FIGS. 2 through 5 so that the code is read from below the jig. In either case, flat face 9 runs in a direction perpendicular to the read window and is of a length such that when the flat face of the jig is pushed up against the guide edge of the file, it prevents pivotal movement of the wand to ensure that the wand is moved in a linear path along the file consistent with the direction in which the code runs at the file edge.

Figure 4:
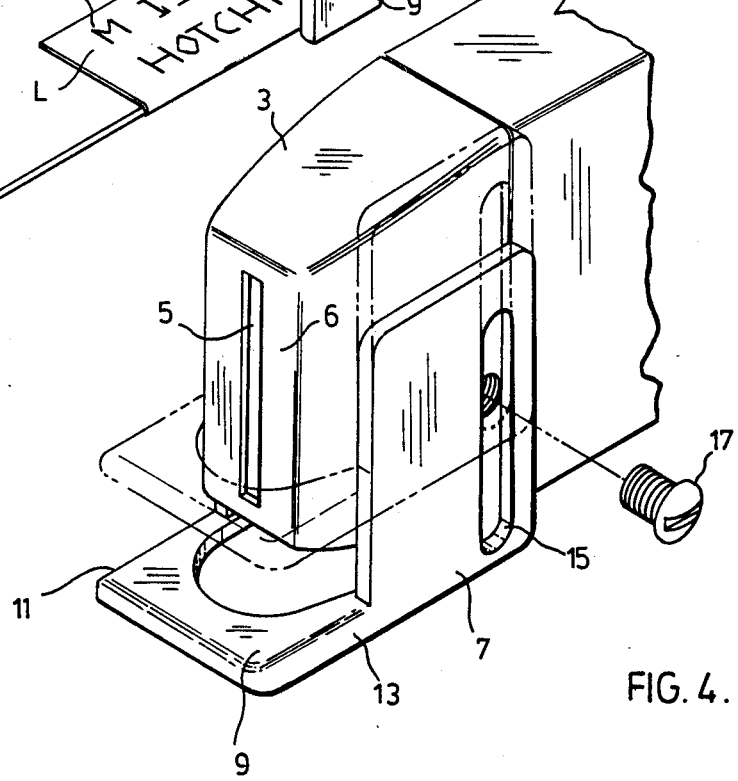
FIG. 4 is an enlarged perspective view showing the forward nose region and guiding jig of the wand of FIG. 3.

The jig is adjustable in position relative to the read window due to the provision of longitudinal slots 15 through which adjustment screws 17 are fitted to secure the jig to the wand as shown in FIG. 4. This permits accurate location of the read window in a proper read position over the code according to the spacing between the code and the guide edge of the file. This spacing will be consistent for an individual filing system, although it may vary from one system to another. Once the jig is adjusted to a desired position, it remains fixed in that position until further adjustment is made. If the jig is used properly, where the jig is forced flatly against the guide edge, the read window is assured of being in a proper read position over the machine readable characters to enable a valid read of the code regardless of how small the tolerances may be.

Figure 5:
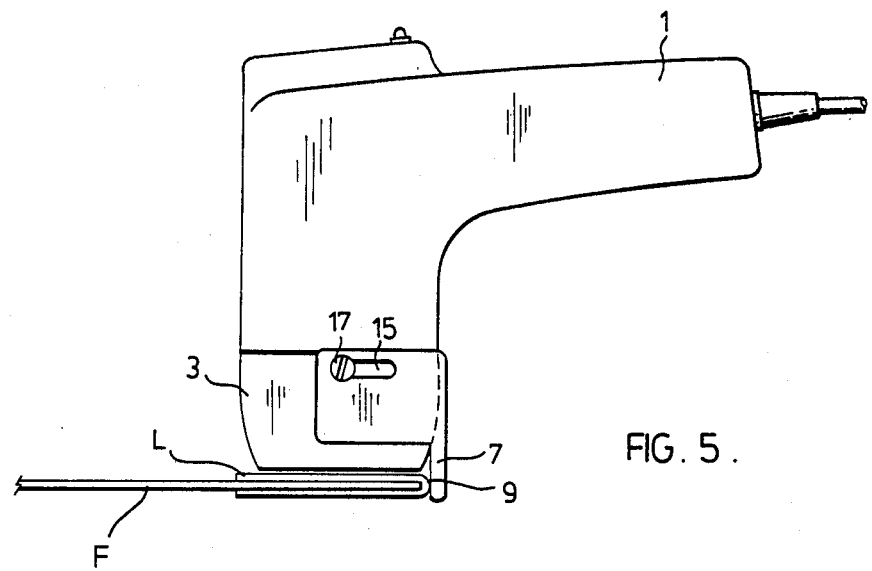
FIG. 5 is a side view of the arrangement shown in FIG. 3.

According to the arrangement shown in the drawings, the code itself is first applied to a label which is thereafter applied along the edge of the file. In FIGS. 3 through 5, this label is indicated at L. In FIG. 7, the label is indicated at $L^1$. Each of these lables L and L1 presents at its outer ends, a small ridge the height of which is equal to the thickness of the lable. It is desirable that the wand rides smoothly over these ridges to prevent tearing of the label. Accordingly, the forward face 6 bordering the read window 5 tapers slightly rearwardly so that the outside edges of the nose region do not catch on the surface of the label. In addition, the outer end regions 11 and 13 of the flat face of the jig curve rearwardly away from the read window to present rounded surfaces where the jig itself initially rides over the edge of the label along the file edge. This substantially eliminates catching of the jig at the label edge.

As will be noted from the above, the code or the coded label must itself be applied such that the machine readable characters run essentially parallel to the guide edge. When the code is applied directly to the file surface, such application is generally made by a printing machine having automatic locating means to ensure that the code runs straight along the file edge. However, the manual application of the label can be more difficult and FIGS. 9 through 15 show a specific arrangement adapted to alleviate this problem. Label L2 shown in FIG. 9 is provided with a pair of identical codes upside down and backwards to one another. This particular label like label L is applied such that it wraps around the edge of the file where the code appears on both sides of the file running parallel to the file edge for machine reading from either side of the coded label.

The label has a sticky rear surface which is covered by a backing paper 33. A fold line 35 is provided centrally of the codes on the label and the backing paper is scored as indicated at 37. This permits separation of the backing paper for removal of a small strip 39 of the backing paper to expose an extended portion 31 of the rear surface of the label.

For accurate application of the label to the file, the label is first folded in half along fold line 35 as shown in FIG. 10 and thereafter, a strip of backing paper 39 is removed from the label as shown in FIG. 11. The label is then fitted on the file by forcing the central fold in the label against the file edge. Portion 31 of the rear sticky surface of the label is pressed to the file to locate the label in position, as shown in FIG. 12. The label is then lifted to the position shown in FIG. 13 where the remainder of the backing paper is removed and refitted in its final position which has been securely located through the securing of portion 31 as shown in FIGS. 14 and 15. This application of the label, if done properly, assures that each of the identical codes runs essentially parallel to the edge of the file in identical spacing therefrom, on either side of the file folder.

As will be understood, a coded filing system in which machine readable codes are accurately applied along the edges of the files in the system, is easily controlled by means of the described system, making use of the handheld wand adapted for accurate reading of the machine readable codes. It is also to be understood however, that the system can be put to other uses such as inventory control and although various preferred embodiments have been described herein in detail, it will be appreciated by those skilled in the art that variations may be made to those preferred embodiments without departing from the spirit of the invention or the scope of the appended claims.

The embodiments of the invention in which an exclusive property or privilege is claimed are defined as follows:

1. A hand-held wand adapted for accurate machine reading of a machine readable code provided on an article with a generally flat edge region having a substantially straight peripheral edge with the machine readable code running generally parallel to such peripheral edge fixed relative thereto, said wand having a precise scan field through a read window requiring a substantially exact locating over the code for reading thereof, said wand being provided with jig means projecting beyond said read window to form an open step-like construction with said jig means being at a substantially 90 degree angle with said read window whereby when the edge region is placed in a horizontal position said jig means extends downwardly over and bears against the peripheral edge to locate said read window over the code, said jig means being of a length to provide a horizontally extended generally upright contact with the peripheral edge to guide movement of said wand and to resist horizontal pivoting of said read window over the code as said jig means rides along the peripheral edge of the horizontally positioned edge region.

2. A handheld wand as claimed in claim 1 adapted for accurate reading of a machine readable optically recognizable code of about 0.1 inches in height.

3. A hand held wand as claimed in claim 2, wherein said jig means is located below the read window for engaging the guide edge from below and for machine reading of the code by said wand from above the edge and jig means.

4. A hand held wand as claimed in claim 2 wherein said jig means is located above the read window for engaging the guide edge from above the code for machine reading of the code by said wand from below the jig means.

5. A file control system as claimed in claim 1, wherein said jig means presents a flat face extending forwardly from the wand and being of a length to bear against a substantial portion of the file edge to prevent pivotal movement of the wand when in the read position, said flat face having at least one edge region which curves rearwardly away from the scan field in the direction of travel of the wand to provide a camming arrangement for camming the jig means over the label for avoiding damage to the label.

6. A hand-held wand as claimed in claim 1 wherein said jig means comprises a flat faced jig which is elongated in direction of travel of said wand.

7. A hand-held wand as claimed in claim 1 when used in a system for identifying the article and the recording location information regarding the article, said wand being connected to recording means which automatically records the location information after the article has been identified, said recording means having a memory for storing and retrieval of such information.

8. A system for identifying and recording whereabouts of a file having a machine readable code provided on a generally flat edge region of the file and running essentially parallel with and fixed relative to a substantially straight peripheral edge of such region, said system comprising a hand-held wand adapted for accurate machine reading of such code and having a precise scan field through a read window requiring a substantially exact locating over the code for reading thereof, said wand being provided with jig means projecting beyond said read window to form an open step-like construction with said jig means being at a substantially right angle with said read window whereby when the file is placed such that the edge region is in a horizontal position said jig means extends downwardly over and bears against the peripheral edge to locate said read window over the code, said jig means being of a length to provide a horizontally extended generally upright contact with the peripheral edge to guide movement of said wand and to resist horizontal pivoting of said read window over the code as said jig means rides along the peripheral edge of the horizontally positioned edge region; said wand being located at a control station of predetermined fixed location, said system further comprising recording means which is adapted to automatically record readily retrievable locating information regarding the file from said control station, said system further being provided with means for indicating a proper machine reading of the machine readable code.

9. A system as claimed in claim 8, wherein said wand has an initial scan field of about 0.4 inches which narrows during machine reading of the code to about 0.3 inches, said jig means, when bearing against the file edge, preventing movement of the wand out of the read position.

10. A system as claimed in claim 8, wherein said jig means is located below said read window such that said wand is particularly suitable for reading a machine readable code running along a side edge of the file.

11. A system as claimed in claim 8, wherein said jig means is located above said read window such that said wand is particularly suitable for reading a machine readable code running along a top edge of the file.

12. A system as claimed in claims 9, 10 or 11, wherein said jig means is adjustably secured to said wand to adapt said wand for use on other files having different spacings between the machine readable code and the file edge with which the jig is engaged.

13. A system as claimed in claim 8, wherein said control station includes a visual display which automatically displays the code, as machine read by the wand for visual verification thereof.

14. A system as claimed in claim 8, wherein said system is adapted to identify a preselected fixed number of machine readable characters in the code for a valid machine reading thereof, said control station having an audible indicator to indicate when the fixed number of machine readable characters have been machine read and to audibly advise the valid machine reading of the code.

15. A system as claimed in claim 14, wherein said characters are about 0.1 inches in height, said machine reader having an initial scan field of about 0.4 inches which narrows during machine reading of the code to about 0.3 inches leaving a maximum tolerance of about 0.1 inches above and below the characters.

16. A file control system as claimed in claim 8 wherein said machine readable code is provided on a label with said label being applied along the edge of the file.

17. A file control system as claimed in claim 16, wherein said label is adapted for accurate manual application along the edge of the file to assist in positioning the machine readable characters in the substantially straight line running essentially parallel to the edge of the file.

18. A file control system as claimed in claim 17 wherein said label comprises a body portion having a forward surface on which said characters are provided and a sticky back surface covered by a backing mterial, said backing material being scored near the edge thereof to permit removal of a small strip of the backing paper for exposing a portion of the sticky back surface which is used to accurately locate the label in position, the remainder of the backing paper being removable to thereafter fully secure the label in the accurately located position.

19. A file control system as claimed in claim 17 wherein said machine readable characters are about 0.1 inches in height and wherein the scan field of the wand is about 0.3 inches providing a tolerance of about 0.1 inches to either side of the characters.

20. A system as claimed in claim 8 wherein the locating information is only recorded based on a valid machine reading of the code and including means for sensing such valid machine reading.

21. A system as claimed in claim 8 wherein said machine readable code is in the form of a plurality of optically recognizable and machine readable characters.

* * * * *